United States Patent

Lischewski et al.

Patent Number: 6,015,621
Date of Patent: Jan. 18, 2000

[54] ULTRAVIOLET DOSIMETER FILM

[75] Inventors: Regina Lischewski, Wolfen; Ursula Sell, Pohritzsch; Jörg Marx, Dessau; Uwe Gohs, Dresden, all of Germany

[73] Assignee: Syntec Gesellschaft für Chemie und Technologie der Informationsaufzeichnung mbH, Germany

[21] Appl. No.: 09/067,969

[22] Filed: Apr. 28, 1998

[30] Foreign Application Priority Data

May 9, 1997 [DE] Germany ............................ 197 19 721

[51] Int. Cl.$^7$ ................................................... G03B 11/00
[52] U.S. Cl. .............................. 428/411.1; 40/1.5; 40/1.6; 250/474.1; 250/482.1; 428/913; 430/141; 430/157; 430/338; 430/340
[58] Field of Search .................... 40/1.5, 1.6; 250/474.1, 250/482.1; 428/913, 411.1; 430/141, 157, 338, 340

[56] References Cited

U.S. PATENT DOCUMENTS

| | | | |
|---|---|---|---|
| 3,773,511 | 11/1973 | Anderson | 96/75 |
| 4,466,941 | 8/1984 | Cerami et al. | 422/57 |
| 4,788,433 | 11/1988 | Wright | 250/474.1 |
| 5,028,792 | 7/1991 | Mullis | 250/474.1 |
| 5,411,835 | 5/1995 | Brinser | 430/138 |
| 5,436,115 | 7/1995 | Mullis | 430/338 |

FOREIGN PATENT DOCUMENTS

| | | | |
|---|---|---|---|
| 41 17 962 | 12/1991 | Germany | 250/474.1 |
| 195 38 129 | 4/1997 | Germany | 430/141 |

*Primary Examiner*—Bruce H. Hess
*Attorney, Agent, or Firm*—Nields Lemack & Dingman

[57] ABSTRACT

An ultraviolet-sensitive dosimeter material comprises at least one diazonium compound featuring absorption in the ultraviolet wavelength range, and a binder. The diazonium compound is preferably formed by a diazonium salt of the general formula

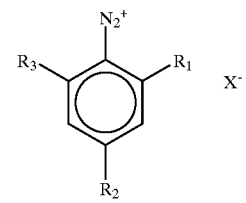

in which $R_1$, $R_2$, $R_3$ and $X^-$ are selected from the following groups:

$R_1$: H, halogen, alkyl with $C_1$–$C_5$, alkoxy with $C_1$–$C_5$, aryloxy, $R_2$: H, halogen, alkyl with $C_1$–$C_5$, alkoxy with $C_1$–$C_5$, aryloxy, NR'R" (R', R" same or differing alkyl compounds or heterocyclic armines, or $COOR_4$ ($R_4$ alkyl with $C_1$–$C_5$), and $R_3$: H, alkoxy with $C_1$–$C_5$, and $X^-$: diazo process anions, or perfluorinated aliphatic or aromatic anions.

6 Claims, No Drawings

ULTRAVIOLET DOSIMETER FILM

The invention relates to test, dosimeter or indicator materials sensitive in the ultraviolet wavelength range, more particularly ultraviolet-sensitive test strips for sensing ultraviolet radiation dosage, and to methods of producing and using same.

Radiation curing by electron or ultraviolet radiation is an effective method of producing surfaces having specific desired properties such as hardness, gloss, scratch resistance or resistance to chemicals. This method is especially clean, free of emissions and relatively energy-saving. In the field of irradiating and curing specific materials (e.g. printing inks, photo-cross-linkable adhesives, coatings for furniture, doors or other wood products) ultraviolet radiation is finding increasing use, in addition to electron radiation. In any radiation curing application there is a need to precisely dose the applied radiation, this requiring, on the one hand, to ensure that the desired cure is achieved down to a satisfactory coating depth and, on the other, avoiding excessive radiation to save energy, boost system productivity and prevent overcuring of the surface being treated.

For optimum, reproducible dosing under greatly differing conditions of application sensing the actual power radiated by a source of ultraviolet radiation and regularly checking its lamp output needs to be implemented to ensure high radiation and curing quality.

It is known to sense ultraviolet radiation with optoelectronic-based sensors or with test materials engineered to achieve photochemical conversions when exposed to ultraviolet radiation.

Optoelectronic sensors are, as a rule, compact sensing instruments which due to the spatial extent of the optoelectronic sensors are not run past the source of ultraviolet radiation together with the surface to be coated (e.g. reel-fed wares) since the source-to-surface distance is inadequate.

A further drawback of optoelectronic sensors (especially of the optical fiber type) is their sensitivity to dust, paint spray and other contamination occurring.

Photochemical test materials are based on photochemical conversions due to radiation absorption. Accordingly, it is known from U.S. Pat. No. 4,788,433 to sense skin exposure to the sun by means of a photochemical test material. Furthermore, a photochromatic material is disclosed in U.S. Pat. No. 5,411,835 which when exposed to absorption in the wavelength range 290 to 365 nm exhibits a change. The color changes of photochemical test materials as they read from U.S. Pat. No. 5,028,792 and U.S. Pat. No. 436,115 are caused by ultraviolet-induced proton transfer.

These known photochemical test materials are not suitable for application in the technical application as cited above since they are adapted to determine ultraviolet radiation over a lengthy period of time. The sensitivity of the known materials is not sufficient to detect or indicate ultraviolet radiation in the millisecond range as employed in curing systems, for example.

There is thus a need to achieve an effective means of ultraviolet sensing having both the sensitivity of optoelectronic sensors and the simple handling of photochemical materials, this requirement not being confined to radiation curing as cited above but relating to all applications in which there is a need to precisely detect radiation dosage with high accuracy for relatively short periods of irradiation.

The object of the invention is to define an improved ultraviolet-sensitive material combining high sensitivity with simple handling, and methods of producing and using same.

This object is achieved by the dosimeter material and a method having the features as set forth in the claims 1 and 8 respectively. Use of the dosimeter material in accordance with the invention reads from claim 10. Advantageous embodiments of the invention materialize from the subclaims.

The invention is based on defining a highly-sensitive dosimeter material having a diazonium compound being capable of absorption in the ultraviolet wavelength range and being disposed in a binder (binding agent). The binder incorporating the diazonium compound is disposed preferably coated on a support material or configured as a self-contained (unsupported) dosimeter layer where the thickness of the binder is sufficient.

The support material or substrate is preferably a flexible or bendable material, e.g. a film or paper-based material or also a thin sheet of metal or glass. The substrate may also be configured rigid, however. The substrate is configured coated especially when the material being irradiated is located on a transport belt passing by a source of ultraviolet radiation (ultraviolet radiator, ultraviolet lamp or the like). The coating thickness is then slightly less than the spacing between the ultraviolet source and the surface of the material to be irradiated.

The ultraviolet-sensitive diazonium compound is formed preferably by a diazonium salt of the general formula

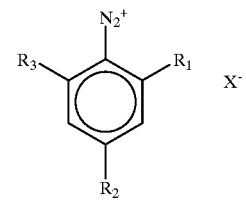

in which $R_1$, $R_2$, $R_3$ and the counter-ion $X^-$ are selected in accordance with a combination of the following possibilites:

$R_1$: H, halogen, alkyl with $C_1$–$C_5$ (preferably $C_1$, $C_2$) alkoxy with $C_1$–$C_5$ (preferably $C_1$, $C_2$), aryloxy, $R_2$: H, halogen, alkyl with $C_1$–$C_5$ (preferably $C_1$, $C_2$) alkoxy with $C_1$–$C_5$ (preferably $C_1$, $C_2$), aryloxy, NR'R" (R', R" same or differing alkyl compounds or heterocyclic amines, e.g. morpholine, piperidine or the like), or $COOR_4$ ($R_4$ alkyl with $C_1$–$C_5$), and $R_3$ H, alkoxy with $C_1$–$C_5$, and $X^-$: diazo process anions, e.g. $BF_4$, $ZnCl_2$, $PF_6$, $BPh_4$, or perfluorinated aliphatic or aromatic anions, e.g. perfluoroctanate, perfluorotetraphenylboranate whereby $R_1$, $R_2$ and $R_3$ may be selected the same or different; preferably, however, $R_1$ or $R_2$ are an alkoxy compound.

The binder used in accordance with the invention is a polymer compound. Preferably used polymer compounds are cellulose ester (especially cellulose acetate and cellulose proprionates), polyvinyl butyrals, polyvinyl acetate or compositions thereof.

In accordance with the invention the binder incorporating the ultraviolet-sensitive diazonium compound additionally contains a stabilizing acid for which preferably use is made of an organic carboxylic, dicarboxylic or sulfonic acid, e.g. trichlor acetic acid, succinic acid, citric acid, sulfosalicylic acid or toluenesulfonic acid.

An ultraviolet-sensitive dosimeter material is produced by mixing a binder solution or binder dispersion for forming the aforementioned polymer compounds with a suitable solvent and adding one or more of the aforementioned diazonium compounds. After coating shaped deposition on the substrate the solvent is eliminated (drying). Once a sufficient coating thickness has been achieved, for example by repeated coating after drying the previous coat, it is possible to release the binder incorporating the diazonium compound from the substrate to form a self-contained dosimeter material. Coating the substrate is done by a usual technique such as brush, spray, pour, dip application or the like. In formulating the coating solution a stabilizing acid, as cited above, may furthermore be added.

Due to ultraviolet absorption the ultraviolet-sensitive diazonium compound is dissociated into components of lesser absorption (breakdown of the diazonium compound). The proportion of the incorporated diazonium compound broken down by the ultraviolet radiation depends on the amount of radiation or ultraviolet dose involved. The proportion of the broken down diazonium compound is sensed in accordance with one of the following methods.

A first method of using or analyzing the compound is based on directly determining the extinction of the diazonium compound still existing following radiation in the dosimeter material by a suitable absorption or transmission measuring device which may be done in a separate procedure irrespective of a sensing radiation procedure. To facilitate determining the extinction in this way, use is made preferably of a self-contained dosimeter material or a substrate transparent to ultraviolet radiation. It also being possible, however, to determine the extinction from reflection sensing.

The difference between the extinction of the irradiated specimen and the extinction of the non-irradiated specimen is a direct measure of the amount of radiation involved (number of photons).

In accordance with a second analysis method it is possible to add a coupling component to the dosimeter material during production, this coupling component being adapted to convert the non-broken down component of the diazonium compounds into an azo dye after irradiation in a development step. Any diazo process coupler can be used. For example a CH acidic compound (e.g. acetoacetanilide or cyan acetic acid amorpholide), an heterocyclic compound (e.g. substituted pyrazolones, triazolium salts) or a coupler having a phenolic or naphtholic basic geometry (e.g. resorcine, beta-naphthol, substituted naphthoic acid anilides) may be employed as the coupling component.

Developing the coupler containing dosimeter material is done by exposing it, after irradiation, to an alkaline solution (e.g. ammonium water, sodium or ammonium carbonate solution, alkaline buffer solution or the like) or a corresponding alkaline gas atmosphere (e.g. ammoniac vapor or the like). The diazonium compound and coupler still existing after irradiation in the dosimeter material are converted into an azo dye, the quantity of which is established after development by a spectroscopic analysis, done for example in a spectral photometer, densitometer or reflectometer. The established optical density of the azo dye (extinction) is inversely proportional to the amount of radiation absorbed.

In accordance with a preferred application of the dosimeter material in accordance with the invention strips of the substrate (e.g. of film or paper) coated ultraviolet-sensitive having a coating thickness as thin as possible are passed through an ultraviolet radiation system together with the material to be irradiated. Breakdown of the ultraviolet-sensitive diazonium compound in the dosimeter material occurs as a function of the dose. The portion of the broken down compound is subsequently analyzed by one of the aforementioned methods.

The advantages afforded by the invention consist of the dosimeter material being simple and reproducable to be fabricated, permitting use in an irradiation process to be monitored without the need of any additional measuring device, it being practically insensitive to contamination whilst exhibiting a substantially higher sensitivity as compared to conventional photochemical test materials. Further benefits to be had from the invention read from the following composition examples of dosimeter materials in accordance with the invention:

EXAMPLES

1. A polyethylene terephthalate film is coated with the following composition:

1 g cellulose diacetate 9 g acetone 0.06 g 2,4 dimethoxybenzene diazonium tetrafluoroborate 0.01 g sulfonsalicylic acid resulting in approx. 300 cm$^2$ coated material which is cut into strips. These strips are passed through an ultraviolet radiation system on a transport belt. The ultraviolet radiator has an output of 120 W/cm. At a speed of 100 m/min the density of the diazonium salt is reduced by approx. 30%. Analyzing the density is done in a spectral photometer.

2. 100 g of a 12% polyvinylbutyral solution in alcohol containing 0.7 g 4-methoxybenzene diazoniumhexafluorophosphate and 0.2 g citric acid are coated to a layer thickness of approx. 8 $\mu$m on a film of cellulose acetate. The ultraviolet radiation is carried out the same as under 1. For 20 ms irradiation exposure the density decreases by approx. 50%.

3. 10 g of a 9% solution of cellulose acetate/propionate in methanol/methylene chloride is spread on polyethylene coated paper with a ductor. Also included in the solution are 0.02 g 2-ethoxybenzene diazoniumtetrafluorocarbonate and 0.8 g p-toluene sulfonic acid 0.03 g 2-hydroxy-3-naphthoic acid anilide as a coupling component.

After irradiation (see 1) the test strip is developed in a concentrated solution of ammonium acetate. The resulting violet color is sensed with a Macbeth densitometer. For a transport belt speed of 50 m/min a residual diazonium content of 60% is obtained.

4. A flexible film of polyester is coated with the following solution:

1.5 g polyvinyl acetate 10 g acetone 2 g methylethyl ketone 0.08 g 2-methoxy-5-chlorobenzene diazoniumperfluoroctanate 0.02 maleic acid.

Irradiation was done as described under 1. The reduction in the density for 10 ms irradiation exposure is about 25%.

5. 100 g of a 10% solution of cellulose acetate in acetone, 0.8 4-morpholino-2-methoxybenzene diazoniumhexafluoro-phosphate and 0.3 g p-toluene sulfonic acid is coated with a layer thickness of approx. 10 mm on a film of polyethylene terephthalate. Ultraviolet irradiation implemented is the same as described under 1. For 10 ms irradiation exposure the density is reduced by approx. 50%.

What is claimed is:

1. An ultraviolet-sensitive dosimeter material comprising at least one diazonium compound featuring absorption in the ultraviolet wavelength range, said diazonium compound being formed by a diazonium salt of the formula:

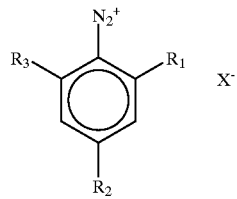

in which $R_1$ is selected from the group consisting of H, halogen, $C_1$–$C_5$ alkyl, $C_1$–$C_5$ alkoxy and aryloxy, $R_2$ is selected from the group consisting of H, halogen, $C_1$–$C_5$ alkyl, $C_1$–$C_5$ alkoxy, aryloxy, NR'HR" (R', R" being the same or differing alkyl compounds or heterocyclic amines), and $COOR_4$ (where $R_4$ is $C_1$–$C_5$ alkyl), $R_3$ is selected from the group consisting of H, $C_1$–$C_5$ alkoxy, and $X^-$ is selected from the group consisting of diazo process anions and perfluorinated aliphatic or aromatic anions, and a binder.

2. The dosimeter material as set forth in claim 1 wherein said binder is a polymer.

3. The dosimeter material as set forth in claim 1 wherein a stabilizing agent is contained.

4. The dosimeter material as set forth in claim 1 wherein a chromatic coupler component is contained.

5. The dosimeter material as set forth in claim 1 wherein said binder with said diazonium compound is disposed as a coating on a substrate.

6. The dosimeter material as set forth in claim 5 wherein said substrate is a layer-shaped, flexible material.

* * * * *